United States Patent
Maleki et al.

(10) Patent No.: US 10,050,300 B2
(45) Date of Patent: Aug. 14, 2018

(54) ELECTROCHEMICAL CELL WITH MULTI-FACETED GEOMETRY

(71) Applicant: Google Technology Holdings LLC, Mountain View, CA (US)

(72) Inventors: Hossein Maleki, Suwanee, GA (US); Jason N. Howard, Alpharetta, GA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 811 days.

(21) Appl. No.: 13/792,444

(22) Filed: Mar. 11, 2013

(65) Prior Publication Data

US 2014/0255739 A1 Sep. 11, 2014

(51) Int. Cl.
*H01M 10/04* (2006.01)
*H01M 2/02* (2006.01)

(52) U.S. Cl.
CPC ... *H01M 10/0431* (2013.01); *H01M 10/0436* (2013.01); *H01M 2002/0205* (2013.01)

(58) Field of Classification Search
CPC ......... H01M 10/0431; H01M 10/0436; H01M 2002/0205
See application file for complete search history.

(56) References Cited

U.S. PATENT DOCUMENTS

| | | | | |
|---|---|---|---|---|
| 6,689,511 B2 * | 2/2004 | Yamada | ............... | H01M 2/1066 429/163 |
| 8,277,966 B2 | 10/2012 | Yoon et al. | | |
| 2001/0005561 A1 | 6/2001 | Yamada | | |
| 2011/0183169 A1 | 7/2011 | Bhardwaj et al. | | |
| 2012/0015223 A1 * | 1/2012 | Bhardwaj | ........... | H01M 2/1027 429/94 |
| 2012/0015236 A1 * | 1/2012 | Spare | .................. | H01M 2/0275 429/162 |
| 2012/0107654 A1 * | 5/2012 | Bhardwaj | ........... | H01M 2/0212 429/94 |
| 2013/0108906 A1 * | 5/2013 | Bhardwaj | ......... | H01M 10/0431 429/94 |
| 2013/0280567 A1 * | 10/2013 | Kwon | ............... | H01M 10/0583 429/94 |

FOREIGN PATENT DOCUMENTS

KR 20030066960 A * 8/2003 ............ H01M 10/12
WO WO2013062661 A1 5/2013

OTHER PUBLICATIONS

Machine Translation KR20030066960(A) (Year: 2003).*

(Continued)

*Primary Examiner* — Jonathan G Leong
*Assistant Examiner* — Victoria Hom Lynch
(74) *Attorney, Agent, or Firm* — McDonnell Boehnen Hulbert & Berghoff LLP

(57) ABSTRACT

An electrochemical cell includes a cathode (401), an anode (402), and a separator (403) disposed between the anode and the cathode. Material is removed from one or both of a first side edge (406,408) and a second side edge (407,409) of the cathode and anode, and optionally the separator. The cathode, the anode, and the separator are arranged in a jellyroll (500) such that the material removed from both the first side edge and the second side edge defines a multi-faceted geometry of the jellyroll.

8 Claims, 15 Drawing Sheets

(56) References Cited

OTHER PUBLICATIONS

International Search Report for Application No. PCT/US2014/016385, dated May 21, 2014, 3 pages.
Written Opinion of the International Searching Authority for Application No. PCT/US2014/016385, dated May 21, 2014, 6 pages.
International Preliminary Report on Patentability for Application No. PCT/US2014/016385, dated Sep. 15, 2015, 7 pages.

* cited by examiner

ELECTROCHEMICAL CELL WITH MULTI-FACETED GEOMETRY

BACKGROUND

Technical Field

This disclosure relates generally to electrochemical cells, and more particularly to wound electrochemical cells.

Background Art

The use of portable communication devices, such as mobile telephones, "smart" devices, and personal digital assistants, is becoming more and more prevalent. People today use these devices not only for communication, but also to maintain to-do lists, surf the Internet, maintain personal and business calendars, and to stay up-to-date with friends, family, and co-workers. These portable devices derive their portability from batteries. Batteries, including rechargeable batteries, allow portable devices to slip the surly bonds of wall outlets and touch the face of a world on the move.

Each battery, be it rechargeable or primary, relies on an electrochemical cell for energy storage. While there may be other components in the battery pack, including circuit boards, mechanical assemblies, protection components, charging components, fuel gauging circuits, temperature measurement circuits and indicator circuits, energy is stored and released by the electrochemical cell.

Each electrochemical cell includes a cathode and an anode. The two are electrically isolated, and offer a current path into or away from the electrochemical cell. The anode and cathode assembly are generally either wound in a "jellyroll" configuration or laminated in a stack.

There is a tension in modern electronic design between the desire to make electronic devices smaller while, at the same time, providing sufficient battery run time. Consequently, space can be limited within the housing of an electronic device. In some instances, the battery of the device dictates either the dimensions or the shape of the overall electronic device.

It would be advantageous to have a battery offering the device designer more flexibility in allocating space within an electronic device.

Figure 1:
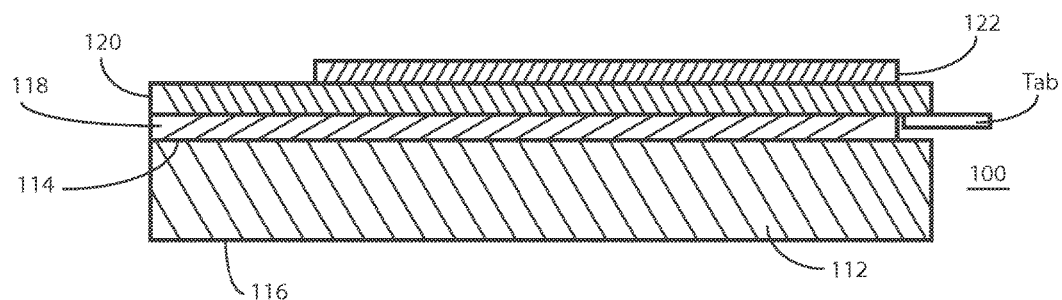
FIG. 1 illustrates a cross-sectional side view of a prior art electrode layer assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electrochemical cell having a cathode, and anode, and a separator disposed between the anode and the cathode. Each of the anode and the cathode define a first side edge and a second side edge running substantially parallel with a length of the cathode and the anode, respectively. In one or more embodiments, material is removed from both the first side edge and the second side edge of the cathode and the anode, respectively. Corresponding material may be removed from the separator in one or more embodiments. The material from the separator can be removed before or after the assembly is wound into a jellyroll. The cathode, anode and separator are then rolled and/or folded into a jellyroll such that the material removed from both the first side edge and the second side edge defines a multi-faceted geometry of the jellyroll.

In one embodiment, the material is removed so as to define one or more indentations along the first side edge and the second side edge of the cathode and the anode, respectively. Material can also be removed from the separator so as to leave the same indentations in the separator as in the cathode and the anode. In one embodiment, the indentation has at least three sides. In another embodiment, the indentation has four or more sides. In yet another embodiment, the indentation has curvilinear sides.

In one embodiment, rather than removing material from the first and second side edges, material is removed from the center of the cathode and the anode so as to leave a series of apertures along each of the anode and the cathode. These apertures may include curvilinear sides or linear sides.

The creation of indentations or apertures, in one or more embodiments, causes the resulting jellyroll to be multi-faceted. In one embodiment, the multi-faceted geometry defines at least one face having six or more sides. In another embodiment, the multi-faceted geometry defines at least one face having curvilinear sides. In another embodiment, the multi-faceted geometry defines at least one L-shaped face. In yet another embodiment, the multi-faceted geometry defines at least one U-shaped face.

In one or more embodiments, each of the cathode and the anode have some portions from which the material is removed and other portions without the material being removed. Which portions have material removed can determine which direction the electrodes are rolled to achieve the multi-faceted jellyroll. For example, in one embodiment, the jellyroll is wound from the portions without the material removed toward the portions from which the material is removed.

In other embodiments, more material is removed from some portions than other portions. This too can affect the way the jellyroll is wound. For example, in one embodiment, the jellyroll is wound from the portions from which more of the material is removed toward the portions from which less of the material is removed.

Turning to FIG. 1, illustrated therein is a cross-sectional side view of a prior art electrode layer assembly. As noted above, electrochemical cells are generally made from a positive electrode (cathode), a negative electrode (anode), and a separator that prevents these two electrodes from touching. While the separator electrically separates the cathode and anode, the separator permits ions to pass through.

The electrode 100 of FIG. 1 includes a separator 112 having a top and bottom 114 and 116. Disposed on the top 114 of the separator 112 is a first layer 118 of an electrochemically active material. For example, in a nickel metal hydride cell, the first layer 118 may be a layer of a metal hydride charge storage material. Alternatively, the first layer 118 may be lithium or a lithium intercalation material as is commonly employed in lithium cells.

Disposed atop first layer 118, is a current collecting layer 120. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collection layer 120 is a second layer 122 of electrochemically active material.

The electrochemical cell stores and delivers energy by transferring ions between electrodes through a separator. For example, during discharge, an electrochemical reaction occurs between electrodes. This electrochemical reaction results in ion transfer through the separator, and causes electrons to collect at the negative terminal of the cell. When connected to a load, such as an electronic device, the electrons flow from the negative pole through the circuitry in the load to the positive terminal of the cell. This is shown in circuit diagrams as current flowing from the cathode to the anode.

When the electrochemical cell is charged, the opposite process occurs. Thus, to power electronic devices, these electrons must be delivered from the cell to the electronic device. This is generally accomplished by coupling conductors, such as conductive foil strips, sometimes referred to colloquially as "electrical tabs" to the various layers. Such tabs are shown in FIG. 2.

Figure 2:
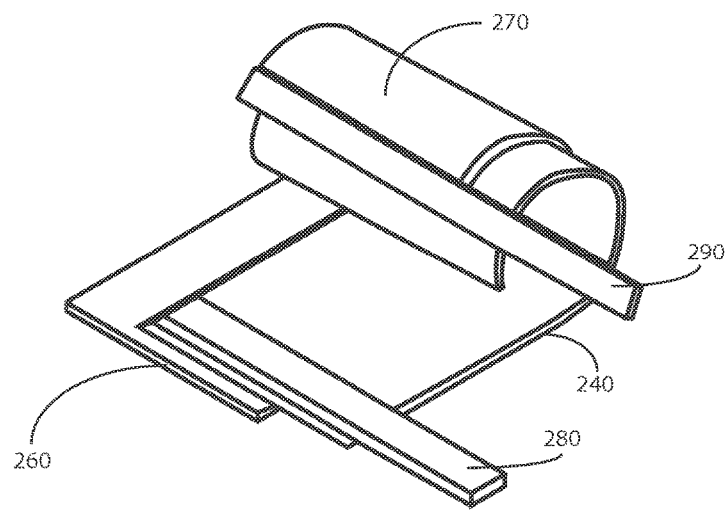
FIG. 2 illustrates a prior art stack of electrodes assembled in the jellyroll configuration.

Referring now to FIG. 2, illustrated therein is stack of prior art electrodes like that in FIG. 1 assembled in the jellyroll configuration so as to make a rechargeable cell. In FIG. 2, two electrodes 240 and 260 are provided as described above. Electrode 240 is fabricated with a layer of active electrode material. For example, electrode 240 is fabricated with electrochemically active negative electrode material while electrode 260 is fabricated with a layer of electrochemically active positive electrode material.

A first tab 280 is coupled to one electrode 240, while a second tab 290 is coupled to another electrode 260. These tabs 280,290 can be coupled to the current collectors of each electrode 240,260.

The electrodes 240 and 260 are arranged in stacked relationship, with the tabs 280,290 being disposed on opposite edges of the stack. Thereafter, the stack is rolled into a roll 270, sometimes referred to as a "jellyroll," for a subsequent insertion into an electrochemical cell housing. The housing can be a metal can or a flexible pouch. Where metal, the housings are generally oval, but can also be rectangular, or circular in cross section as well. The housings have an opening that is sealed when the roll 270 is inserted.

Figure 3:
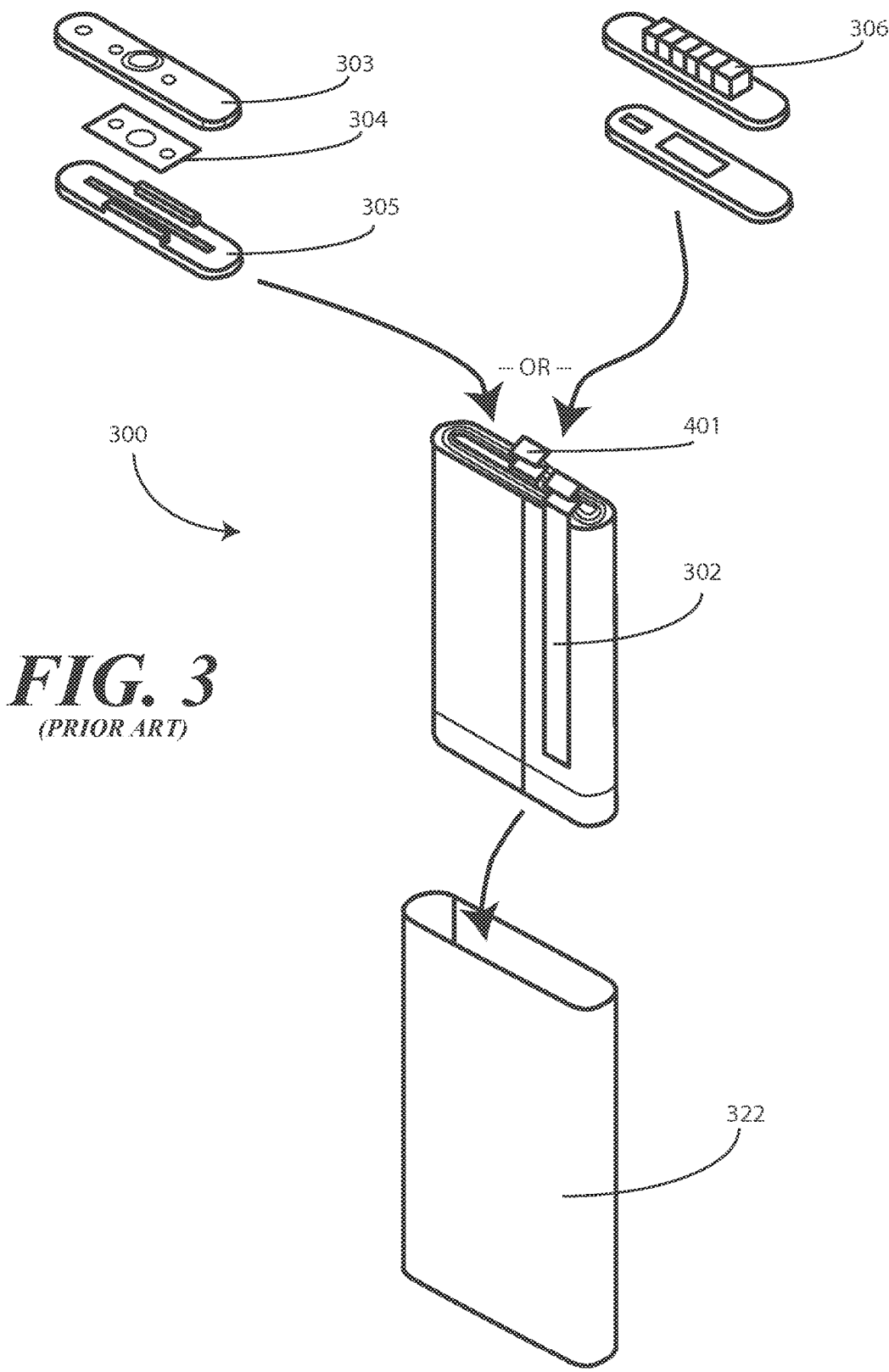
FIG. 3 illustrates a prior art cell construction.

As shown in FIG. 2, when the electrodes 240,260 are rolled, tab 290 will end up substantially in the center of the roll 270, while tab 280 will end up generally on the periphery of the roll 270. When the roll 270 is placed in a housing, as shown in FIG. 3, that tab 290 will be centrally disposed within the housing. Tab 280 will be disposed peripherally within the housing.

Turning now to FIG. 3, illustrated therein is a prior art cell 300. Tab 302 is disposed on one side at the periphery of the housing 322, while tab 301 is centrally disposed. Accordingly, when viewed from the front of the page, tab 302 appears on the right of tab 301. When viewed from the rear, tab 302 is left of tab 301.

In the illustrative embodiment of FIG. 3, the housing 322 can be sealed in a variety of ways, two examples of which are shown. In one illustrative embodiment, the housing 322 can be sealed by a lid 303. The lid 303, which can be manufactured from metal, is connected to tab 301 through lid 303 and serves as one electrical terminal of the cell. An insulator 305 can be provided to isolate the lid 303 from the second tab 302. The second tab 302 can be coupled to the housing 322, which serves as the other terminal of the cell. Where the housing 322 is manufactured from aluminum, the housing 322 will be connected to the cathode. Conversely, where the housing 322 is manufactured from steel, the housing 322 will be connected to the anode. Constructions similar to that of FIG. 3 are known in the art as recited in U.S. Pat. No. 6,317,335 to Zayatz.

In alternate embodiments, the tabs 301,302 can be connected to a terminal block 306 rather than to the lid 303 and housing 322. The terminal block 306 provides a convenient way for both the positive terminal and negative terminal to reside on a common end of the cell 300. Note that the terminal block 306 of FIG. 3 is shown to provide a conceptual illustration only. Actual terminal blocks of cells will vary from manufacturer to manufacturer in size and physical geometry.

Figure 4:
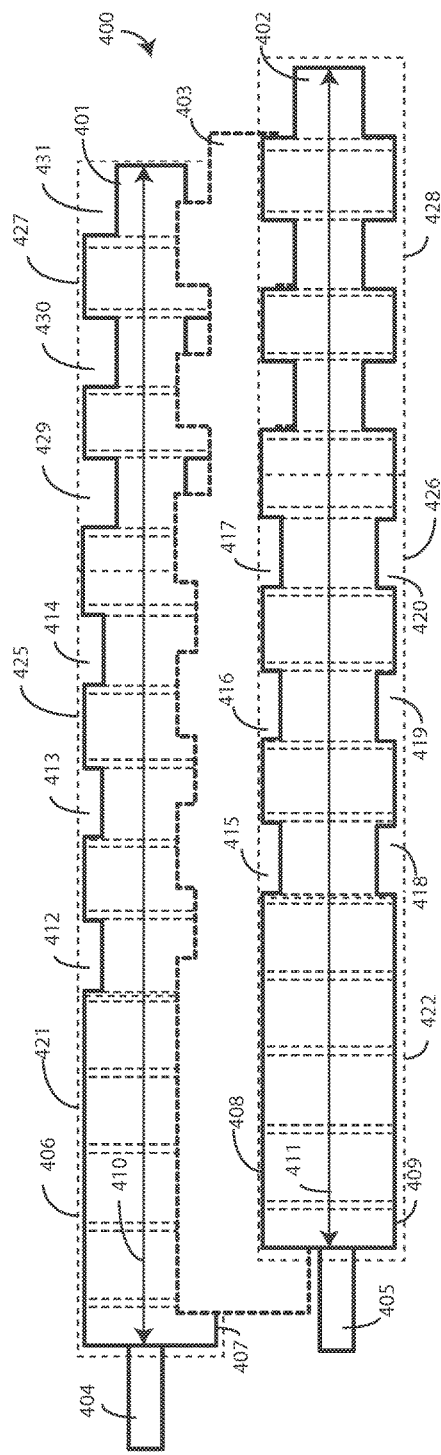
FIG. 4 illustrates an electrode assembly in accordance with one or more embodiments.

Turning now to FIG. 4, illustrated therein is an electrode assembly 400 in accordance with one or more embodiments of the disclosure. The electrode assembly 400 includes a cathode 401, an anode 402 and a separator 403. The separator 403 is disposed between the cathode and the anode

402. A first tab 404 is coupled to the cathode 401, while a second tab 405 is coupled to the anode 402. These tabs 404,405 can be coupled to the current collectors of the cathode 401 and the anode 402, respectively.

Each of the cathode 401 and the anode 402 define a first and second side edge. For example, the cathode 401 defines a first side edge 406 and a second side edge 407. In one embodiment, the first side edge 406 of the cathode 401 and the second side edge 407 of the cathode 401 are substantially parallel with a length 410 of the cathode 401. Similarly, in one embodiment, the first side edge 408 of the anode 402 and the second side edge 409 of the anode 402 are substantially parallel with a length 411 of the anode 402.

As shown in FIG. 4 in one or more embodiment material has been removed from both the first side edge 406 and the second side edge 407 of the cathode 401. Additionally, material has been removed from the first side edge 408 and the second side edge 409 of the anode 402. In this embodiment, material has been removed to leave indentations 412,413,414,415,416,417,418,419,420 in the first side edge 406 of the cathode 401, the second side edge 407 of the cathode 401 (in which material has been removed so as to be the same geometry as second side edge 409 of the anode 402), the first side edge 408 of the anode 402 and the second side edge 409 of the anode 402. In one embodiment, the indentations 412,413,414,415,416,417,418,419,420 are effectively voids defined in the cathode 401, the anode 402, and optionally the separator 403.

In one embodiment, the indentations 412,413,414,415, 416,417,418,419,420 have at least three sides. In other embodiments described below, the indentations can have four, five, six, or more sides. In the embodiment of FIG. 4, the indentations 412,413,414,415,416,417,418,419,420 are rectilinear and have at least three sides. Specifically, the indentations 412,413,414,415,416,417,418,419,420 of this illustrative embodiment include three rectilinear sides. However, the indentations 412,413,414,415,416,417,418,419, 420 could easily be replaced with the indentations of FIG. 8 below that have five sides, or alternatively with the indentations of FIG. 9 below that have seven sides. In this illustrative embodiment, the separator 403 also has material removed so as to have indentations as do the cathode 401 and the anode 402.

As shown in this embodiment, each of the cathode 401 and the anode 402 having some portions 423,424 from which the material is removed and other portions 421,422 without the material being removed. In one or more embodiments, a jellyroll can be formed by winding the portions 421,422 without the material being removed toward the portions 423,424 from which the material is removed.

As can also be seen in this illustrative embodiment, each of the cathode 401 and the anode 402 having some portions 425,426 from which less of the material is removed and other portions 427,428 from which more of the material is removed. For example, indentations 429,430,431 are deeper into the first side edge 406 of the cathode 401 than are indentations 412,413,414 due to the fact that more material has been removed. In one or more embodiments, a jellyroll can be formed by winding from the portions 427,428 from which more of the material is removed toward the portions 425,426 from which less material is removed.

Figure 5:
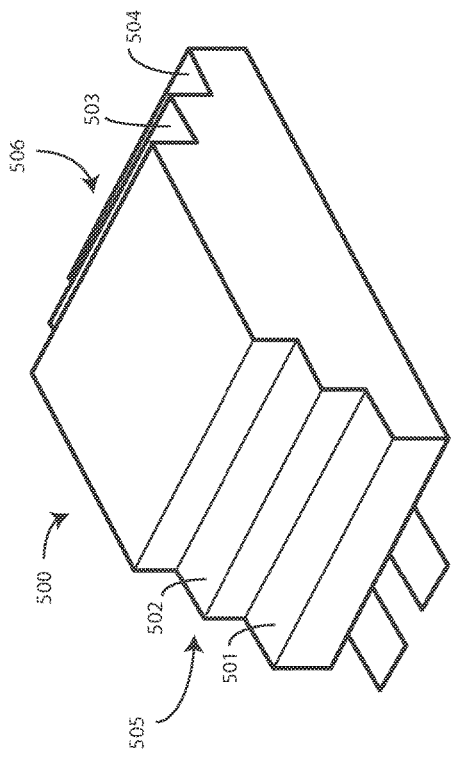
FIG. 5 illustrates a jellyroll in accordance with one or more embodiments.

As shown in FIG. 5, when the cathode (401), the separator (403), and the anode (402) are rolled into a jellyroll 500, the removed material from both the first side edge (406) of the cathode (401), the second side edge (407) of the cathode (401), the first side edge (408) of the anode (402), and the second side edge (409) of the anode (402) define a multi-faceted geometry of the jellyroll 500. In this illustrative embodiment, the jellyroll 500 defines a dual-stair-stepped structure having two steps 501,502 disposed along a first side 505 of the jellyroll 500 and two steps 503,504 disposed along a second side 506 of the jellyroll 500. In this embodiment, the first side 505 and the second side 506 of the jellyroll 500 are opposite each other due to the fact that material has been removed from both the first side edge (406) and the second side edge (407) of the cathode (401) as well as having been removed from the first side edge (408) and the second side edge (409) of the anode (402).

Figure 6:
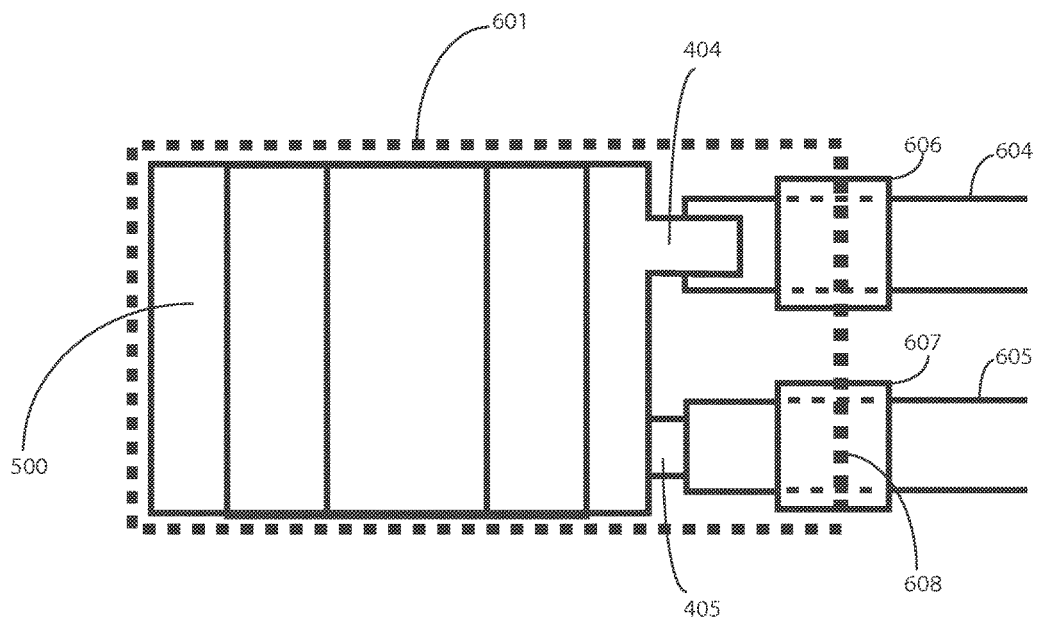
FIG. 6 illustrates a battery in accordance with one or more embodiments.

Turning to FIG. 6, the jellyroll 500 has been inserted into a housing 601. As noted above, the housing 601 can comprise a rigid housing, such as a metal can, or optionally can be flexible, such as a synthetic pouch. In one embodiment, the housing 601 is a laminated polymer package. Metallic layers in such laminated packaging are insulated from the anode (402) and cathode (401).

The tabs 404,405, which are constructed from metal foil in this explanatory embodiment, are joined to an external tab 604,605. The external tabs 602,603 provide electrical conductivity to external components. As with the anode (402) and cathode (401), the tabs 404,405 and the external tabs 604,605 are arranged so as to remain electrically isolated from each other.

To accomplish the electrical isolation, when the jellyroll 500 is placed into the housing 601, an opening 608 of the housing 601 is then sealed about the external tabs 604,605. A tight seal may be required about the external tabs 604,605 to prevent any electrolyte from escaping the housing 601. The tight seal also prevents dust, moisture, and debris from entering the cell.

To ensure a tight seal, with no space or pockets on the sides of the external tabs 604,605, plastic sealing members 606,607 are placed about the external tabs 604,605. The housing 601 is then sealed about the plastic sealing members 606,607.

Figure 7:
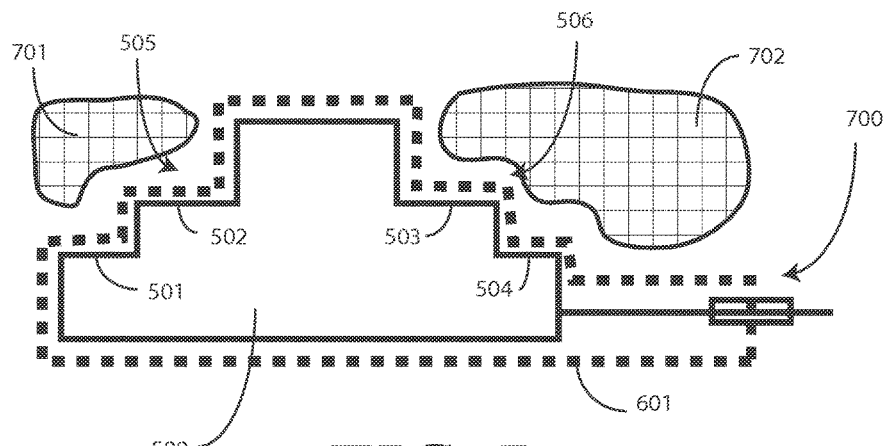
FIG. 7 illustrates a battery in accordance with one or more embodiments.

Turning to FIG. 7, a side view of the completed assembly 700 is shown. The indentations (412,413,414,415,416,417, 418,419,420) in the cathode (401) and anode (402) that created the dual-stair-stepped structure having two steps 501,502 disposed along a first side 505 of the jellyroll 500 and two steps 503,504 disposed along a second side 506 of the jellyroll 500 allow circuit or other components 701,702 to be placed within the voids defined by the stair steps. Note that the components 701,702 could be placed within the housing 601 in one embodiment. In another embodiment, where the housing 601 is configured as a pouch, the pouch can be vacuum-sealed about the jellyroll 500 so that the components 701,702 can be placed against the assembly 700. As is understood from the view of FIG. 7, the voids defined by the stair steps provide additional space within an electronic device in which components can be disposed. Alternatively, the voids defined by the stair steps can allow the assembly to be disposed in areas within an electronic device in which a prior art rectangular cell would not fit. Illustrating by example, the assembly 700 may be configured to fit within a corner of a mobile phone, laptop computer, tablet computer, portable media, digital camera, and/or PDA.

Figure 8:
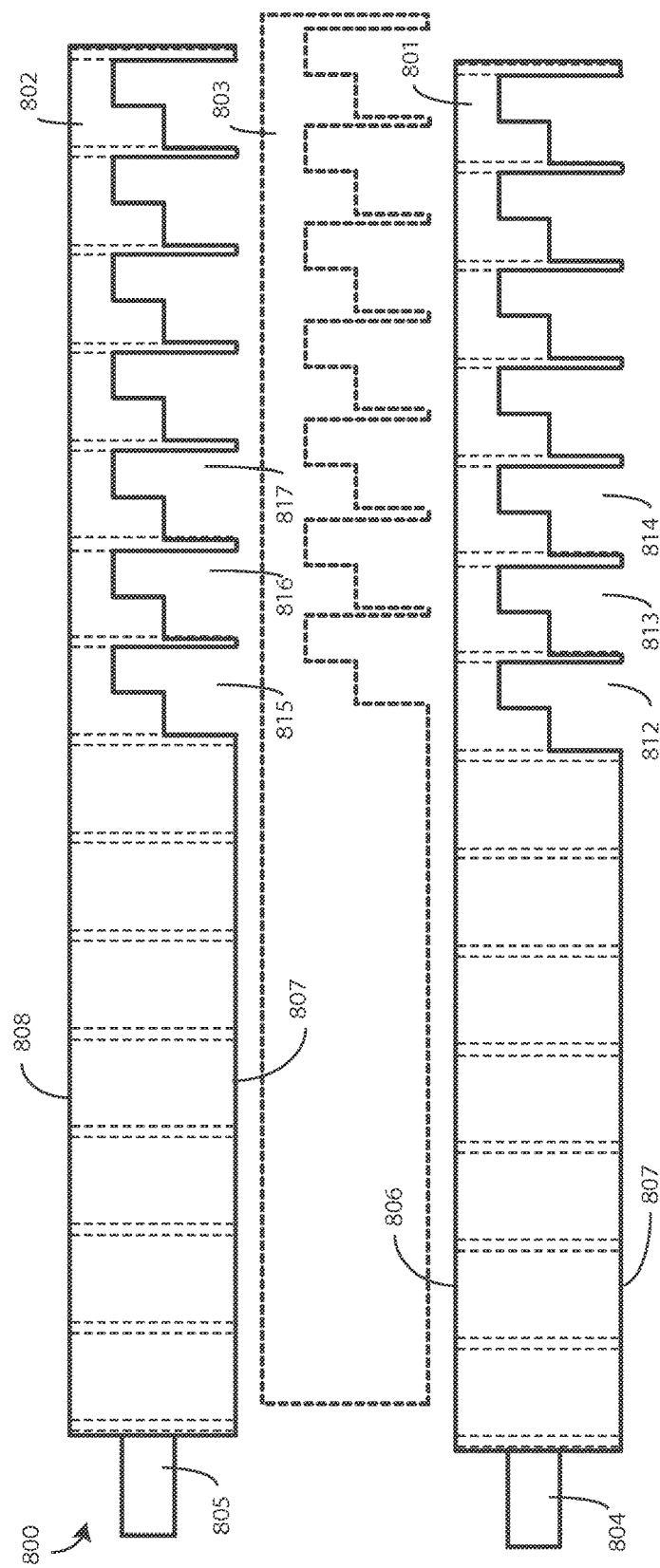
FIG. 8 illustrates illustrates an electrode assembly in accordance with one or more embodiments.

FIG. 8 illustrates electrode assembly 800 in accordance with one or more embodiments of the disclosure. The electrode assembly 800 includes a cathode 801, an anode 802, and a separator 803. The separator 803 is disposed between the cathode and the anode 802. A first tab 804 is coupled to the cathode 801, while a second tab 805 is coupled to the anode 802. These tabs 804,805 can be coupled to the current collectors of the cathode 801 and the anode 802, respectively.

Each of the cathode 801 and the anode 802 define a first and second side edge. For example, the cathode 801 defines a first side edge 806 and a second side edge 807. Similarly, the anode 802 defines a first side edge 808 and a second side edge 809.

As with the embodiment of FIG. 4 above, material has been removed from both the cathode 801 and the anode 802. In this illustrative embodiment, material has been removed from the second side edge 809 of the anode 802 and the second side edge 807 of the cathode 801. While material being removed from one side edge is shown in FIG. 8 for ease of illustration, in one or more embodiments the material can be removed from both side edges.

In this embodiment, material has been removed to leave indentations 812,813,814,815,816,817 in the second side edge 807 of the cathode 801 and the second side edge 809 of the anode 802. In this illustrative embodiment, the indentations 812,813,814,815,816,817 are rectilinear and have five sides. In this illustrative embodiment, the separator 803 also has material removed so as to have indentations as do the cathode 801 and the anode 802. In this illustrative embodiment, the indentations 812,813,814,815,816,817 are all the same size, although they could also have been different sizes as was the case in FIG. 4 above.

Figure 9:
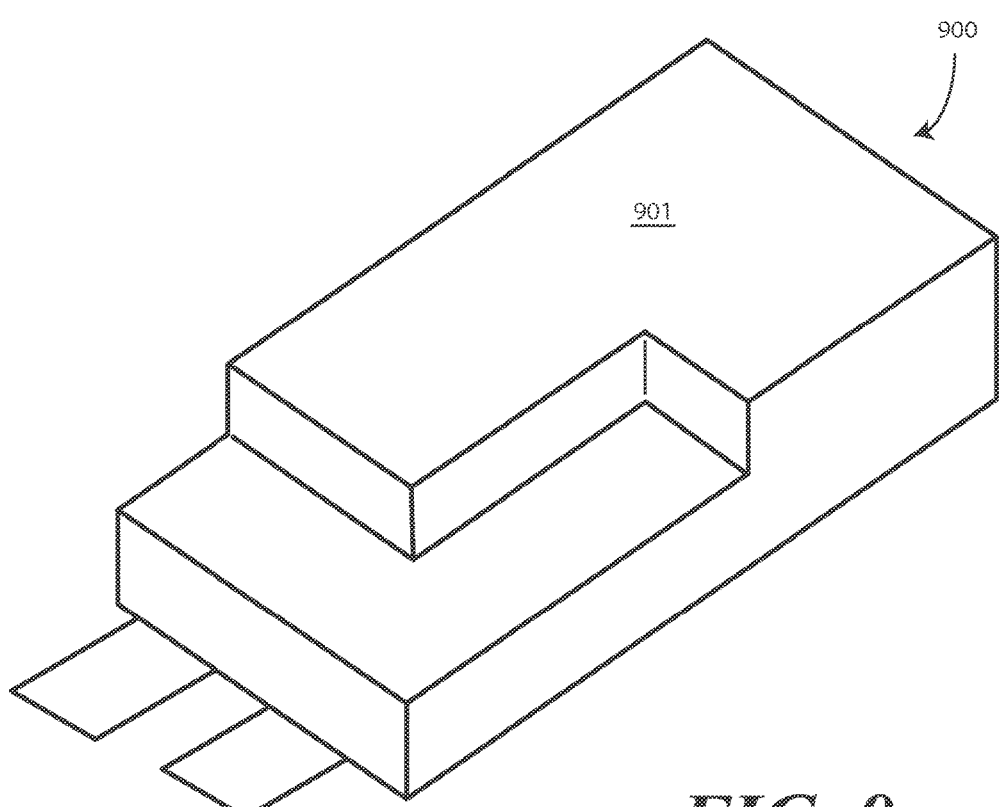
FIG. 9 illustrates a jellyroll in accordance with one or more embodiments.

As shown in FIG. 9, when the cathode (801), the separator (803), and the anode (802) are rolled into a jellyroll 900, the removed material from both the cathode (801) and the anode (802) define a multi-faceted geometry of the jellyroll 900. In this illustrative embodiment, the multi-faceted geometry of the jellyroll 900 defines at least one face having six or more sides. For example, side 901 has six sides. Side 901 is L-shaped in this explanatory embodiment.

Figure 10:
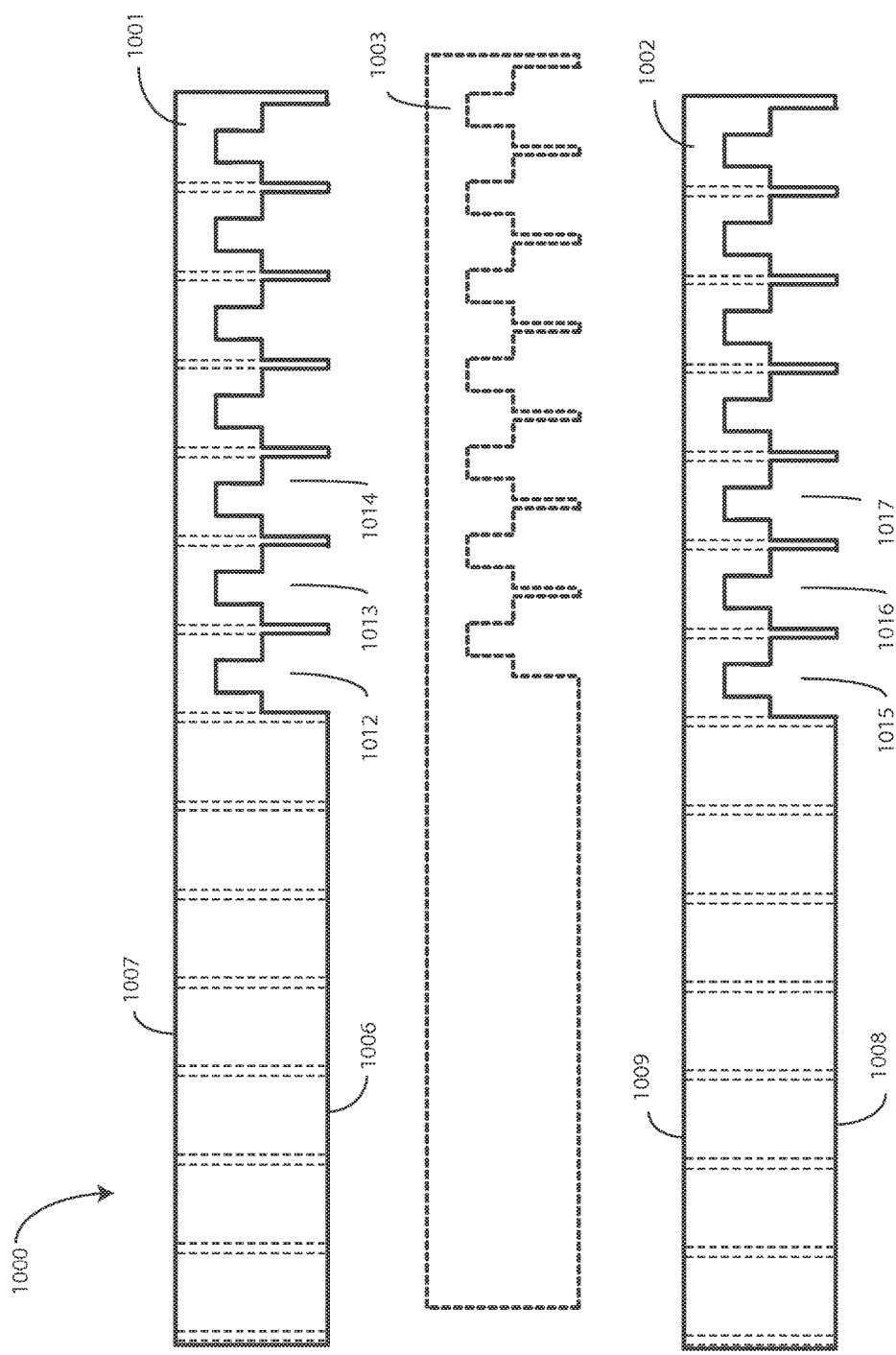
FIG. 10 illustrates an electrode assembly in accordance with one or more embodiments.

FIG. 10 illustrates another electrode assembly 1000 in accordance with one or more embodiments of the disclosure. The electrode assembly 1000 includes a cathode 1001, an anode 1002, and a separator 1003. The separator 1003 is disposed between the cathode 1001 and the anode 1002. A first tab 1004 is coupled to the cathode 1001, while a second tab 1005 is coupled to the anode 1002. These tabs 1004,1005 can be coupled to the current collectors of the cathode 1001 and the anode 1002, respectively.

Each of the cathode 1001 and the anode 1002 define a first and second side edge. For example, the cathode 1001 defines a first side edge 1006 and a second side edge 1007. Similarly, the anode 1002 defines a first side edge 1008 and a second side edge 1009.

As with the embodiment of FIG. 4 above, material has been removed from both the cathode 1001 and the anode 1002. In this illustrative embodiment, material has been removed from the first side edge 1008 of the anode 1002 and the first side edge 1006 of the cathode. While material being removed from one side edge is shown in FIG. 10 for ease of illustration, in one or more embodiments the material can be removed from both side edges.

In this embodiment, material has been removed to leave indentations 1012,1013,1014,1015,1016,1017 in the first side edge 1006 of the cathode 1001 and the first side edge 1008 of the anode 1002. In this illustrative embodiment, the indentations 1012,1013,1014,1015,1016,1017 are rectilinear and have five sides. In this illustrative embodiment, the separator 1003 also has material removed so as to have indentations as do the cathode 1001 and the anode 1002. In this illustrative embodiment, the indentations 1012,1013, 1014,1015,1016,1017 are all the same size, although they could also have been different sizes as was the case in FIG. 4 above.

Figure 11:
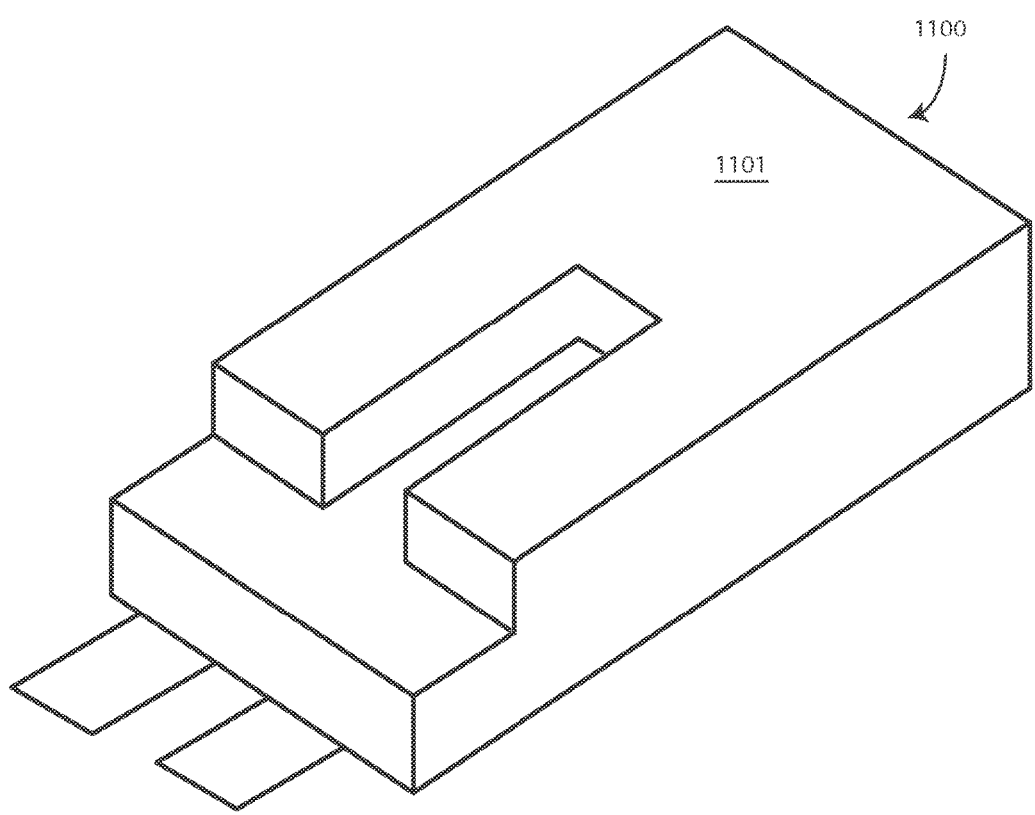
FIG. 11 illustrates a jellyroll in accordance with one or more embodiments.

As shown in FIG. 11, when the cathode (1001), the separator (1003), and the anode (1002) are rolled into a jellyroll 1100, the removed material from both the cathode (1001) and the anode (1002) define a multi-faceted geometry of the jellyroll 1100. In this illustrative embodiment, the multi-faceted geometry of the jellyroll 1100 defines at least one face having six or more sides. For example, side 1101 has eight sides. Side 1101 is U-shaped in this explanatory embodiment.

Figure 12:
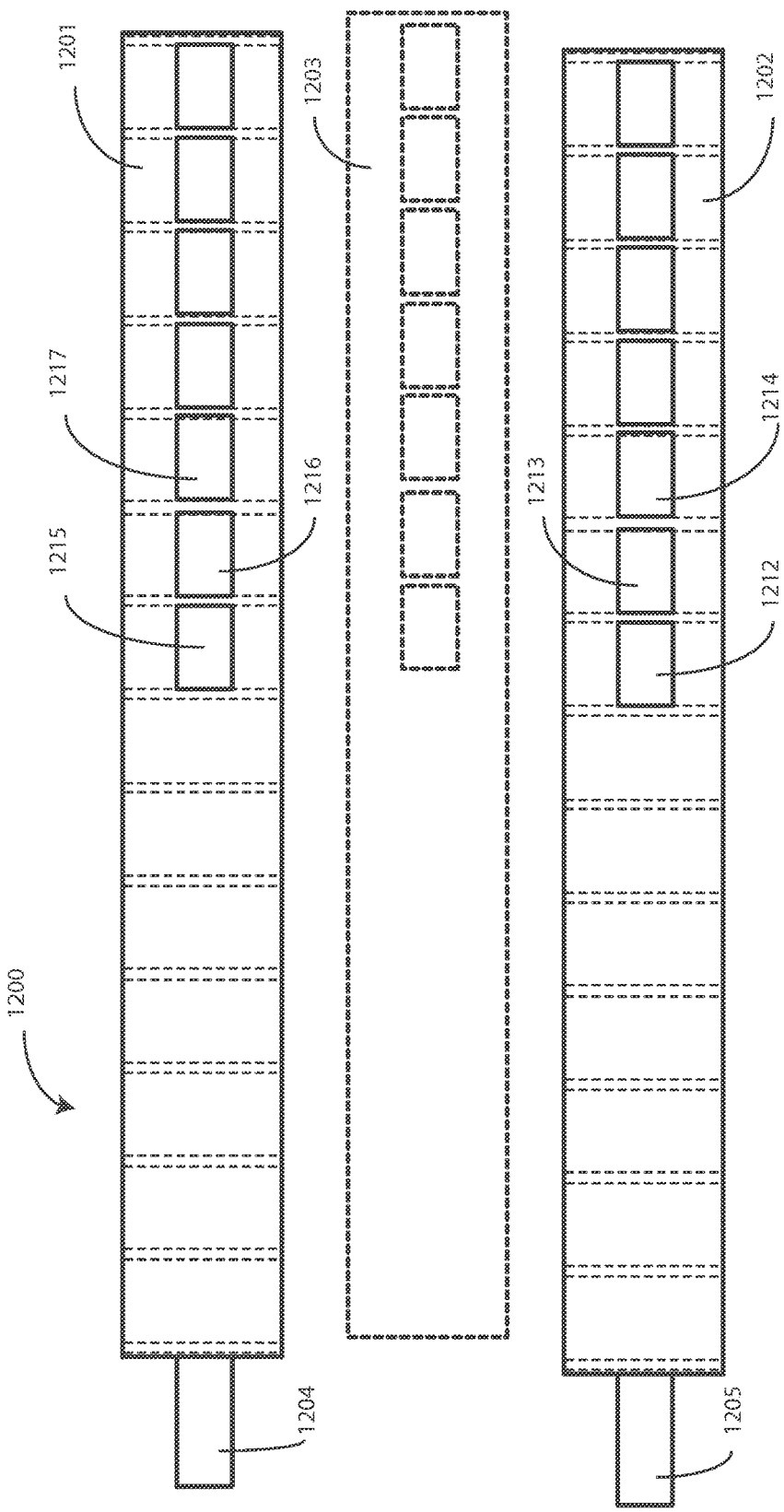
FIG. 12 illustrates an electrode assembly in accordance with one or more embodiments.

FIG. 12 illustrates another electrode assembly 1200 in accordance with one or more embodiments of the disclosure. The electrode assembly 1200 includes a cathode 1201, an anode 1202, and a separator 1203. The separator 1203 is disposed between the cathode 1201 and the anode 1202. A first tab 1204 is coupled to the cathode 1201, while a second tab 1205 is coupled to the anode 1202. These tabs 1204,1205 can be coupled to the current collectors of the cathode 1201 and the anode 1202, respectively.

As with the embodiments above, material has been removed from both the cathode 1201 and the anode 1202. In contrast to the previous embodiments, rather than removing material to leave indentations in one or both side edges, in this embodiment material has been removed from the cathode 1201 and anode 1202 to leave a series of apertures 1212,1213,1214,1215,1216,1217 along each of the anode 1202 and the cathode 1201. As with the embodiment of FIG. 4, the embodiment of FIG. 12 has some portions of the cathode 1201 and the anode 1202 from which the material is removed, and other portions of the cathode 1201 and the anode 1202 without the material being removed. The apertures 1212,1213,1214,1215,1216,1217 are disposed along the portion from which the material is removed.

Figure 13:
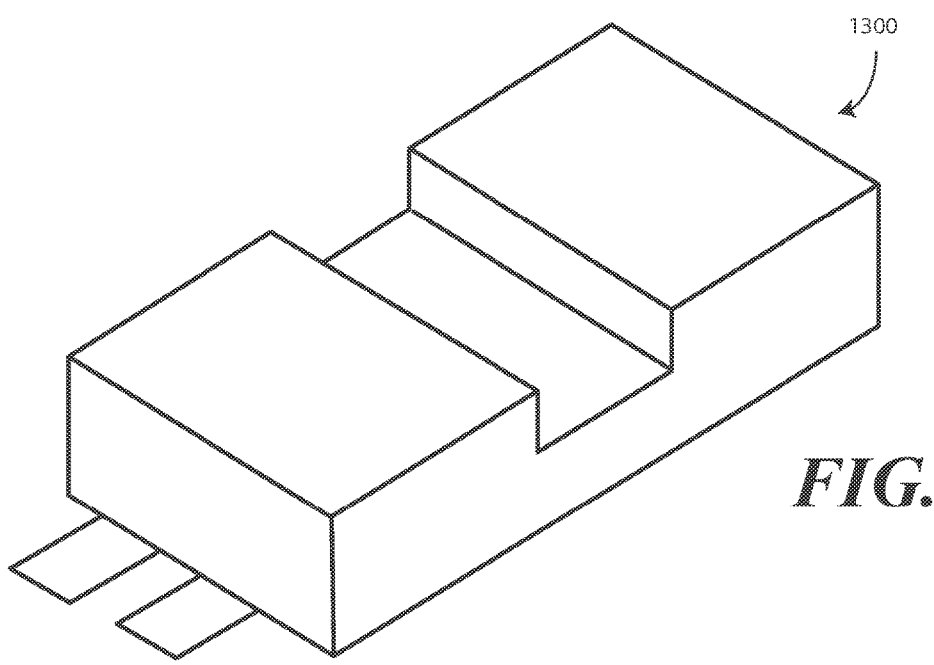
FIG. 13 illustrates a jellyroll in accordance with one or more embodiments.

In this illustrative embodiment, the apertures 1212,1213, 1214,1215,1216,1217 are rectilinear and have four sides, although they could have three sides, five sides, or more sides in other embodiments. In this illustrative embodiment, the separator 1003 also has material removed so as to have apertures as do the cathode 1201 and the anode 1202. In this illustrative embodiment, the apertures 1212,1213,1214, 1215,1216,1217 are all the same size, although they could also have been different sizes as well. As shown in FIG. 13, when the cathode (1201), the separator (1203), and the anode (1202) are rolled into a jellyroll 1300, the removed material from both the cathode (1201) and the anode (1202) define a multi-faceted geometry of the jellyroll 1100.

Figure 14:
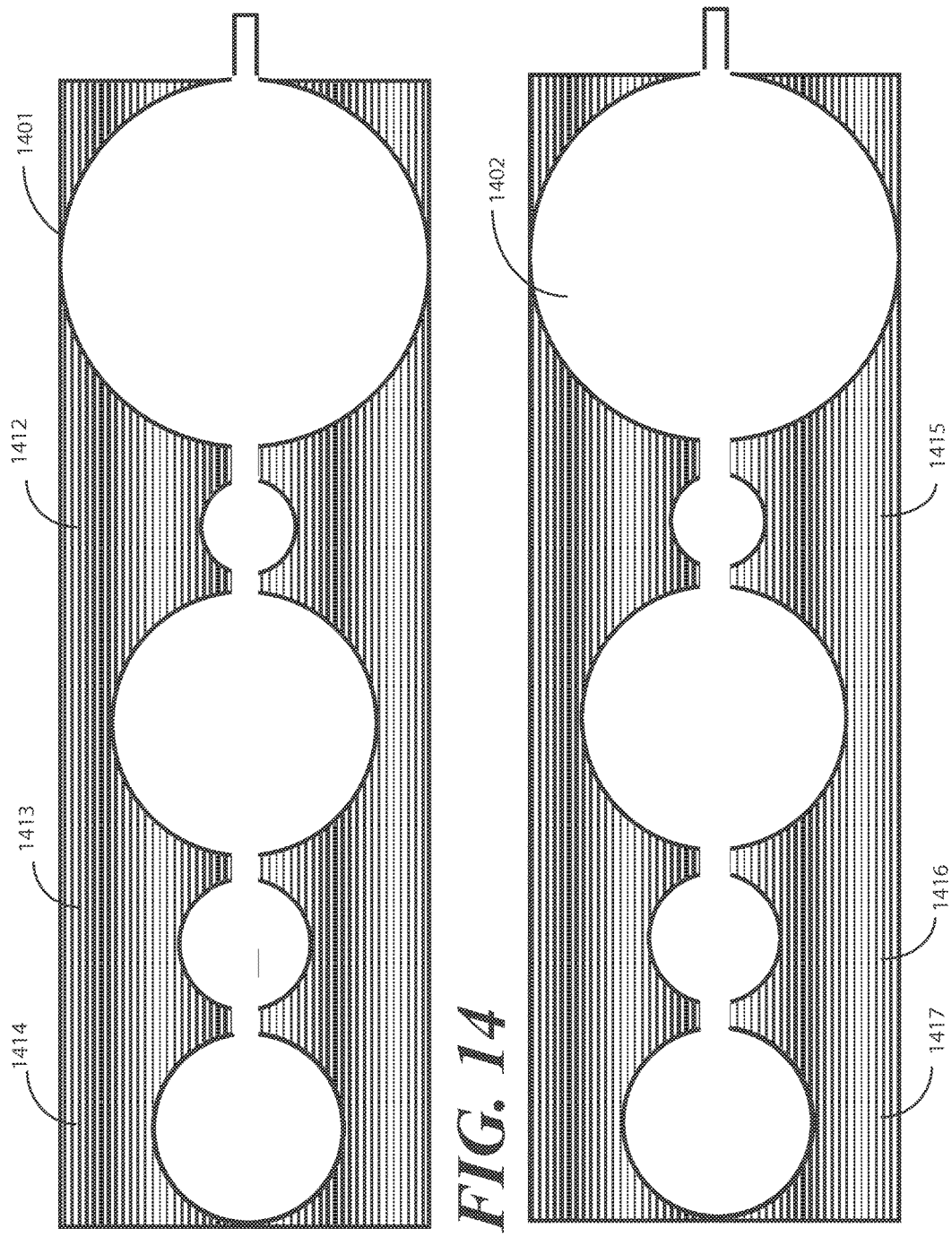
FIG. 14 illustrates an electrode assembly in accordance with one or more embodiments.
Figure 15:
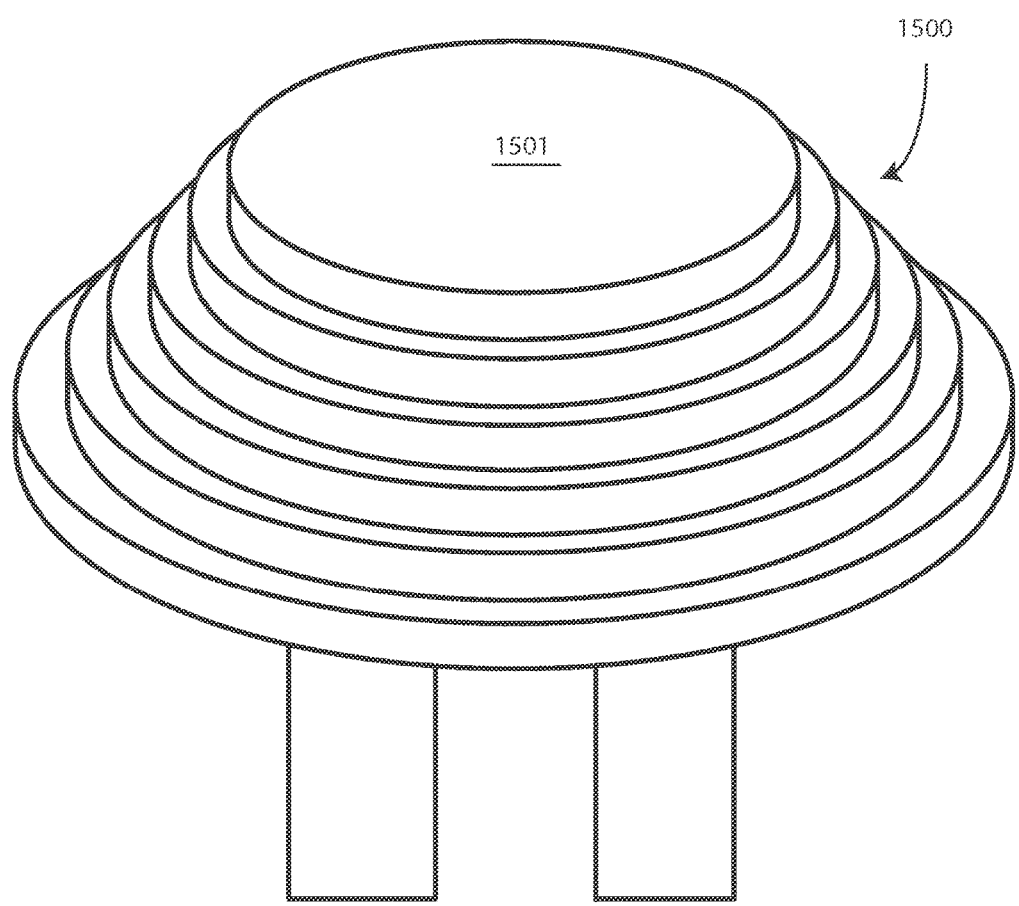
FIG. 15 illustrates a jellyroll in accordance with one or more embodiments.

FIG. 14 shows a cathode 1401 and an anode 1402 having material removed to leave curvilinear indentations 1412, 1413,1414,1415,1416,1417. The curvilinear indentations 1412,1413,1414,1415,1416,1417 are of different sizes, as more material is removed to leave smaller curvilinear indentations 1412,1415 along some portions of the cathode 1401 and anode 1402, while less material is removed to leave larger curvilinear indentations 1414,1417 along other portions of the anode 1402 and cathode 1401. When rolled from the portions with more material removed toward portions with less material removed, a very unique jellyroll 1500, shown in FIG. 15, results. The jellyroll 1500 has at least one face 1501 with curvilinear sides.

Figure 16:
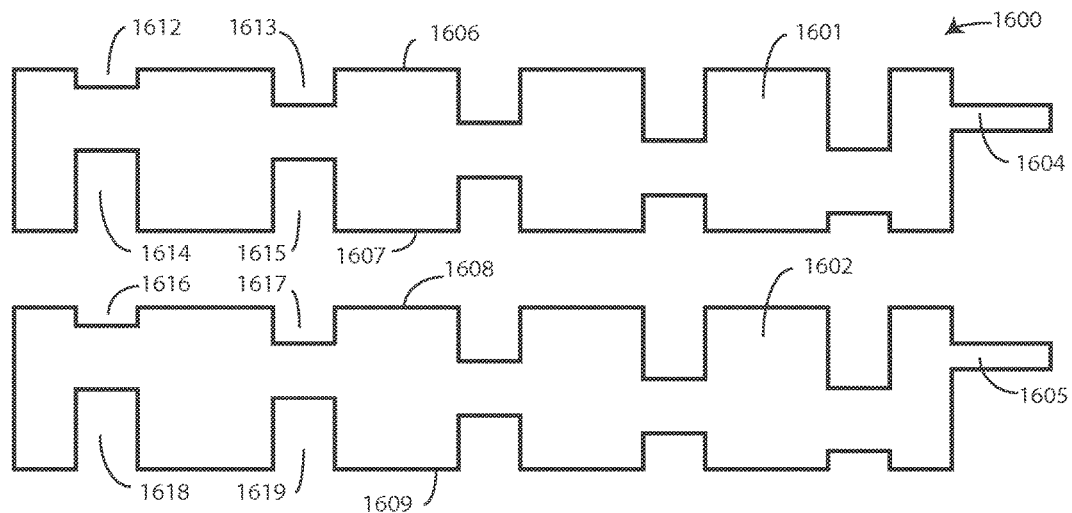
FIG. 16 illustrates an electrode assembly in accordance with one or more embodiments.

FIG. 16 illustrates another electrode assembly 1600 in accordance with one or more embodiments of the disclosure. The electrode assembly 1600 includes a cathode 1601, an anode 1602, and a separator (not shown). The separator is disposed between the cathode 1601 and the anode 1602. A first tab 1604 is coupled to the cathode 1601, while a second tab 1605 is coupled to the anode 1602. These tabs 1604,1605 can be coupled to the current collectors of the cathode 1601 and the anode 1602, respectively.

Each of the cathode 1601 and the anode 1602 define a first and second side edge. For example, the cathode 1601 defines a first side edge 1606 and a second side edge 1607. Similarly, the anode 1602 defines a first side edge 1608 and a second side edge 1609.

As with the embodiment of FIG. 4 above, material has been removed from both the cathode 1601 and the anode 1602. In this illustrative embodiment, material has been removed from the first side edge 1608 and the second side edge 1607 of the anode 1602 and the first side edge 1606 and the second side edge 1609 of the cathode 1601. While material being removed from two side edges is shown in FIG. 10 for ease of illustration, in one or more embodiments the material can be removed from only one side edge.

In this embodiment, material has been removed to leave indentations 1612,1613,1614,1615,1616,1617,1618,1619 in the cathode 1001 and the anode 1002. In this illustrative embodiment, the indentations 1612,1613,1614,1615,1616, 1617,1618,1619 are rectilinear and have three sides. However, the indentations 1612,1613,1614,1615,1616,1617, 1618,1619 have different depths. For example, indentation 1612 is shallower than indentation 1613. Similarly, indentation 1614 is deeper than indentation 1615. This results in the indentations 1612,1613,1614,1615,1616,1617,1618, 1619 having different sizes.

Figure 17:
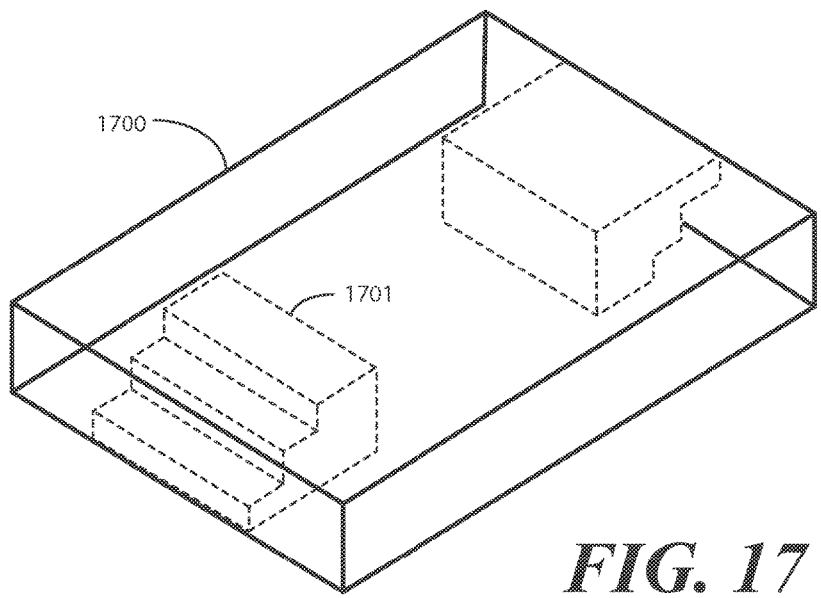
FIG. 17 illustrates a jellyroll in accordance with one or more embodiments.

As shown in FIG. 17, when the cathode (1601), the separator (1603), and the anode (1602) are rolled into a jellyroll 1700, the removed material from both the cathode (1601) and the anode (1602) define a multi-faceted geometry of the jellyroll 1700. In this illustrative embodiment, the multi-faceted geometry of the jellyroll 1700 defines at least one void 1701 having six or more sides. For example, void 1701 has nine sides.

Figure 18:
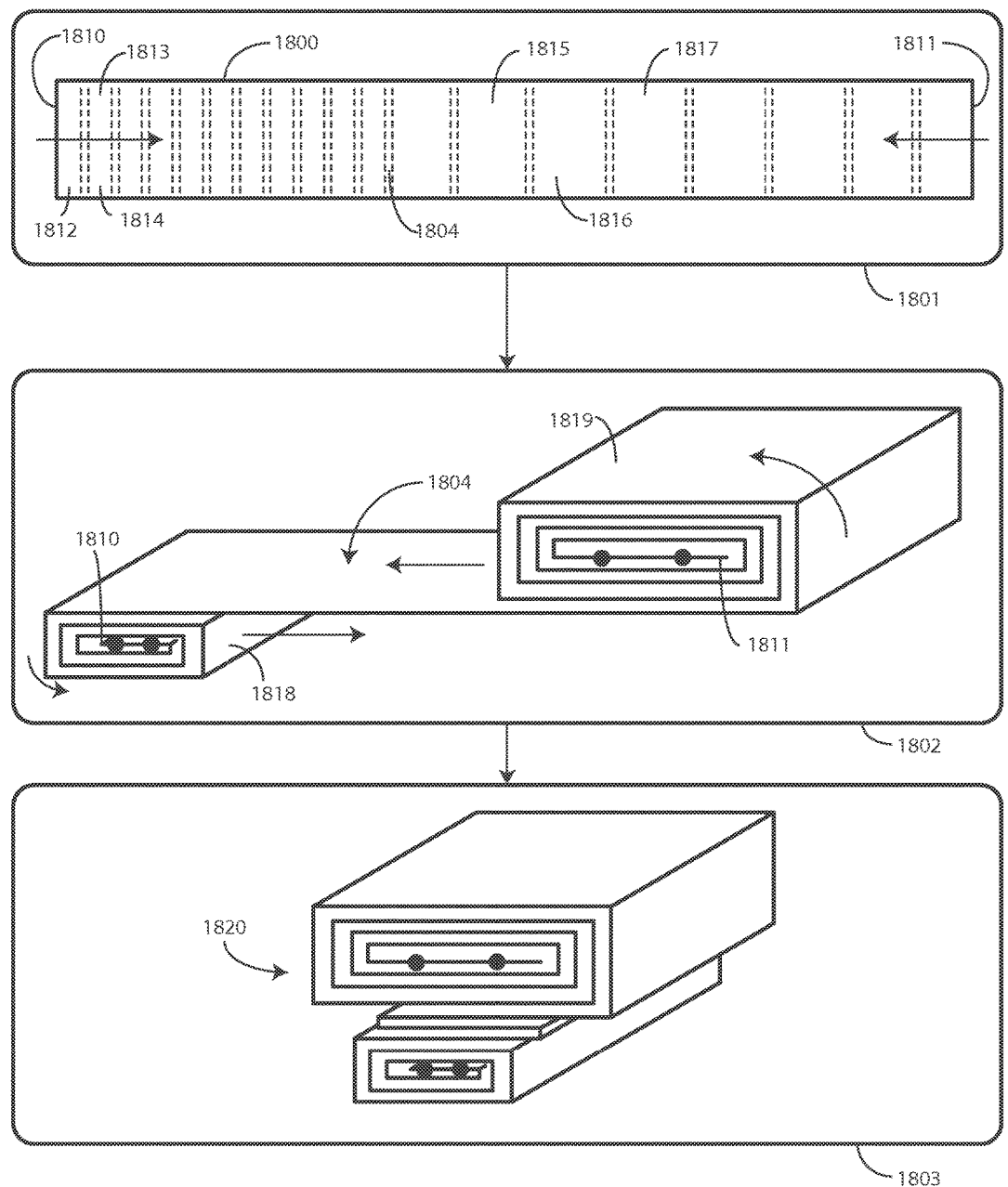
FIG. 18 illustrates a method of making a multi-faceted jellyroll in accordance with one or more embodiments.
Figure 19:
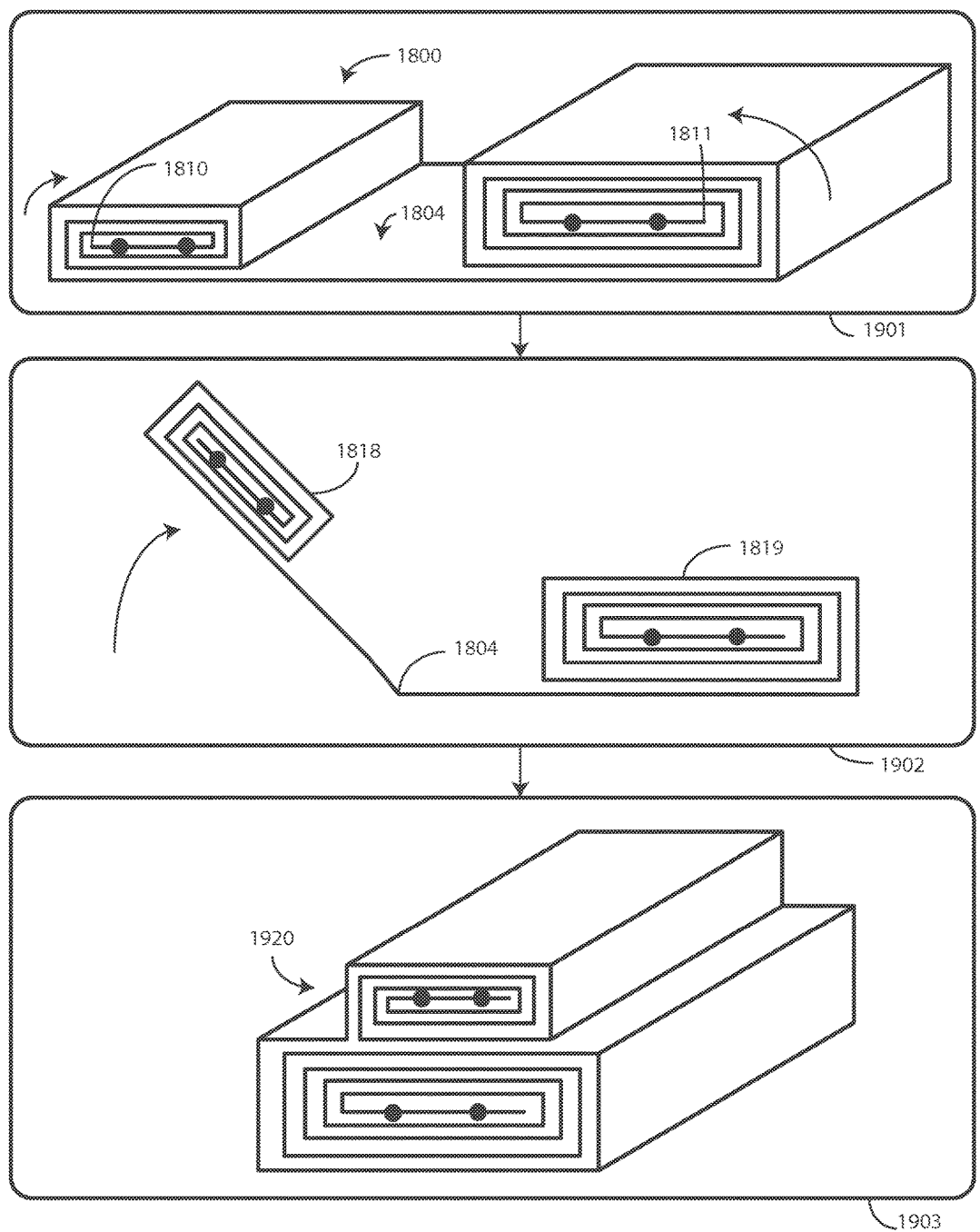
FIG. 19 illustrates a method of making a multi-faceted jellyroll in accordance with one or more embodiments.

To this point, multi-faceted geometries have been constructed by removing material from the cathode, anode, and optionally, the separator. It should be noted, however, that there are other techniques for forming multi-faceted geometries. Turning now to FIGS. 18 and 19, illustrated therein are two such methods.

In each of FIGS. 18 and 19, a cathode, an anode, and a separator are formed into an assembly. Each end of the cathode, the anode, and the separator are then wound toward a center of the assembly to form a jellyroll. In one embodiment, a first end is wound at lengths greater than the second end. The two portions formed are then folded together to form a multifaceted geometry of the jellyroll.

Beginning with FIG. 18, at step 1801 an electrode assembly 1800 is portioned into different lengths 1812,1813,1814, 1815,1816,1817. For example, lengths 1812,1813,1814 are greater than lengths 1815,1816,1817.

At step 1802, a first end 1810 of the electrode assembly 1800 is wound toward a center 1804 of the assembly. Similarly, a second end 1811 is wound toward the center. In this embodiment, the first end 1810 and the second end 1811 are both wound counter clockwise. Further, the first end 1810 is wound at lengths that are lesser than the lengths at which the second end 1811 is wound. Upon reaching the center 1804, which may not be at the middle of the width of the assembly, the two portions 1818,1819 are folded about the center 1804 at step 1802 to form a jellyroll 1820 having a multi-faceted geometry at step 1803.

In FIG. 19, at step 1901 the first end 1810 of the electrode assembly 1800 is wound toward a center 1804 of the assembly. Similarly, the second end 1811 is wound toward the center. In this embodiment, the first end 1810 is wound clockwise, while the second end 1811 is wound counter clockwise. Further, the first end 1810 is wound at lengths that are lesser than the lengths at which the second end 1811 is wound. Upon reaching the center 1804, which may not be at the middle of the width of the assembly, the two portions 1818,1819 are folded about the center 1804 at step 1902 to form a jellyroll 1920 having a multi-faceted geometry at step 1903.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electrode assembly, comprising:
    a cathode;
    an anode; and
    a separator between the anode and the cathode,
    wherein the cathode, the anode, and the separator form:
        a first section having a first width perpendicular to a length of the electrode assembly, wherein the first width is a widest width of the first section that is perpendicular to the length of the electrode assembly;
        a second section having a second width perpendicular to the length of the electrode assembly that is less than the first width, wherein the second section is in contact with the first section, and wherein the second width is a widest width of the second section that is perpendicular to the length of the electrode assembly; and
        a third section having a third width perpendicular to the length of the electrode assembly that is equal to the first width, wherein the third width is a widest width of the third section that is perpendicular to the length of the electrode assembly, wherein the third section is in contact with the second section, wherein the second section is between the first section and the third section, wherein the third section is at least as long as the second section parallel to the length of the electrode assembly, and wherein a portion of the first section having the first width is longer, parallel to the length of the electrode assembly, than any portion of the third section having the first width.

2. The electrode assembly of claim 1, wherein material is removed from the electrode assembly to form the second section.

3. The electrode assembly of claim 1,
    wherein the electrode assembly is rollable along the length of the electrode assembly to form a first layer of an electrochemical cell having the first width and a second layer of the electrochemical cell having the second width, and wherein the electrode assembly is rollable from the first section toward the second section to form the first layer and the second layer.

4. The electrode assembly of claim 1, wherein material is removed from opposite sides of the electrode assembly to form the second section.

5. The electrode assembly of claim 1, wherein the electrode assembly is rollable along the length of the electrode assembly to form a first layer of an electrochemical cell having the first width and a second layer of the electrochemical cell having the second width, and wherein the first layer and the second layer form a first stair-step structure at a first end of the electrochemical cell and a second stair-step structure at a second end of the electrochemical cell that is opposite the first end.

6. The electrode assembly of claim 1, wherein rectangular sections of material are removed from the electrode assembly to form the second section.

7. The electrode assembly of claim 6, wherein each of the rectangular sections of material have a width equal to the difference between the first width and the second width.

8. The electrode assembly of claim 6, wherein each of the rectangular sections of material has a length equal to a length of the second section along the length of the electrode assembly.

\* \* \* \* \*